(12) United States Patent
Ens et al.

(10) Patent No.: US 11,993,116 B2
(45) Date of Patent: May 28, 2024

(54) AIR-SUSPENSION MODULE FOR A RIGID AXLE WITH SIMPLIFIED INSTALLATION

(71) Applicant: JOST-Werke Deutschland GmbH, Neu-Isenburg (DE)

(72) Inventors: Alexander Ens, Bad Driburg (DE); Christof Germershausen, Göttingen (DE); Tobias Neutze, Calden (DE)

(73) Assignee: Jost-Werke Deutschland GmbH, Neu-Isenburg (DE)

( * ) Notice: Subject to any disclaimer, the term of this patent is extended or adjusted under 35 U.S.C. 154(b) by 0 days.

(21) Appl. No.: 17/900,906

(22) Filed: Sep. 1, 2022

(65) Prior Publication Data

US 2023/0074394 A1 Mar. 9, 2023

(30) Foreign Application Priority Data

Sep. 3, 2021 (DE) ...................... 10 2021 122 897.2

(51) Int. Cl.
*B60G 11/28* (2006.01)

(52) U.S. Cl.
CPC .......... *B60G 11/28* (2013.01); *B60G 2200/13* (2013.01); *B60G 2202/152* (2013.01);
(Continued)

(58) Field of Classification Search
CPC .............. B60G 11/28; B60G 2202/152; B60G 2206/424; B60G 2204/126; B60G 2300/02
See application file for complete search history.

(56) References Cited

U.S. PATENT DOCUMENTS

| 5,342,139 A | * | 8/1994 | Hoffman | F16B 5/065 |
| | | | | 267/64.23 |
| 9,327,573 B2 | * | 5/2016 | Weber | B60G 11/28 |

FOREIGN PATENT DOCUMENTS

| DE | 829368 C | 1/1952 |
| DE | 3811306 A1 | 11/1988 |

(Continued)

OTHER PUBLICATIONS

German Search Report for corresponding DE 10 2021 122 897.2 dated Jul. 14, 2022, 7 pgs.
(Continued)

*Primary Examiner* — Faye M Fleming
(74) *Attorney, Agent, or Firm* — Rankin, Hill & Clark LLP

(57) ABSTRACT

An air-suspension module for a rigid axle including an air-bellows mount and an air-bellows module supported on the air-bellows mount in the operational state of the air-suspension module, the air-bellows module having an air-suspension bellows designed to change its shape and a supporting body connected to the air-suspension bellows, one of the components of the air-bellows mount and the supporting body having a coupling projection protruding along a virtual projection path, which engages with a coupling recess formed at the respectively other component along the projection path, a translatory relative movement of the supporting body being physically limited relative to the air-bellows mount, orthogonally with respect to the projection path and in a direction along the projection path; one of the components of the air-bellows mount and the supporting body having a latching body and the respectively other component of the air-bellows mount and the supporting body having a latching recess such that the latching body is in a form-locking latching engagement with the latching recess, so that a translatory relative movement of the sup- (Continued)

porting body relative to the air-bellows mount is physically limited in the two opposite directions along the projection path.

19 Claims, 5 Drawing Sheets

(52) U.S. Cl.
CPC .......... *B60G 2204/126* (2013.01); *B60G 2204/4604* (2013.01); *B60G 2206/424* (2013.01); *B60G 2300/02* (2013.01)

(56) References Cited

FOREIGN PATENT DOCUMENTS

| DE | 19952919 A1 | * | 6/2000 | ............ B60G 11/28 |
|---|---|---|---|---|
| DE | 102007008965 A1 | | 8/2007 | |
| DE | 102008053886 A1 | | 5/2009 | |
| DE | 102011051237 A1 | | 12/2012 | |
| DE | 102016110038 A1 | | 11/2017 | |
| EP | 0554573 A2 | | 8/1993 | |
| GB | 2317213 B | | 10/2000 | |

OTHER PUBLICATIONS

Espacenet Bibliographic data: EP 0554573 (A2), Published Aug. 11, 1993, 1pg.
Espacenet Bibliographic data: DE 3811306 (A1), Published Nov. 24, 1988, 1pg.
Espacenet Bibliographic data: DE 102007008965 (A1), Published Aug. 30, 2007, 1pg.
Espacenet Bibliographic data: DE 102008053886 (A1), Published May 7, 2009, 1pg.
Espacenet Bibliographic data: DE 102016110038 (A1), Published Nov. 30, 2017, 1pg.
European Search Report for corresponding EP 22193559.6 dated Jul. 14, 2022, 7 pgs.
Espacenet Bibliographic data: DE 102011051237(A1), Published Dec. 27, 2012, 1pg.

* cited by examiner

Fig. 1  Stand der Technik

AIR-SUSPENSION MODULE FOR A RIGID AXLE WITH SIMPLIFIED INSTALLATION

This application claims priority in German Patent Application DE 10 2021 122 897.2 filed on Sep. 3, 2021, which is incorporated by reference herein.

The present invention relates to an air-suspension module for a rigid axle of a commercial vehicle, in particular of a cargo truck. The air-suspension module comprises an air-bellows mount and an air-bellows module supportable on the air-bellows mount and supported on the air-bellows mount in the operational state of the air-suspension module, the air-bellows module having an air-suspension bellows designed to change its shape in suspension operation and a supporting body connected to the air-suspension bellows, one of the components of the air-bellows mount and the supporting body having a coupling projection protruding along a virtual projection path, which in the operational state of the air-suspension module engages with a coupling recess formed on the respectively other component of the air-bellows mount and the supporting body along the projection path, a translatory relative movement of the supporting body, in the operational state of the air-suspension module, being physically limited relative to the air-bellows mount orthogonally with respect to the projection path and in a direction along the projection path.

BACKGROUND OF THE INVENTION

An air-suspension module of this type is known in the relevant field under the product name "DCA Railmaster" of the applicant. This Railmaster air-suspension module is a variant, which was constructed for loading air-suspended cargo trucks onto other means of transport. The most frequently used other means of transport for such a piggyback transport of cargo trucks is the railway, and hence the product name.

On rigid axles of cargo trucks, the air-bellows mount, which is normally an oblong component, is anchored at a mounting end on an axle body of the rigid axle and protrudes from the latter crosswise with respect to the axle direction of the axle body. At the bearing end of the air-bellows mount opposite from the mounting end, the air-bellows module is supported via its supporting body. The air bellows of the air-bellows module is designed to deform elastically in operation along a virtual suspension path. Normally, the air bellows is arranged in the direction away from the air-bellows mount along the suspension path following upon the supporting body and is connected to the supporting body. The air bellows is permanently connected to the vehicle frame. Via the air-bellows module, the vehicle frame is thus supported in resilient fashion on the axle body.

In conventional air-suspension modules, the supporting body is as permanently connected to the air-bellows mount as the air-bellows is permanently connected to the vehicle frame, being screwed for example using two screws or threaded pins arranged respectively with parallel shafts.

In the process of loading a cargo truck having an air-suspended rigid axle, the vehicle is usually lifted off the ground by a hoisting device engaging with the vehicle frame and is set onto the further means of transport. Upon lifting the cargo truck off the ground, the axle body, which is now suspended from the vehicle frame and held by the vehicle frame, exerts a tensile force on the air-bellows module, by which the air-bellows may be fully stretched. When subsequently setting down the cargo truck, there exists a risk that the air-bellows buckles as it compresses from its stretched position, instead of returning to its intended operating position partially compressed along the suspension path. A buckled air-bellows has not only lost all spring action so that the originally air-suspended vehicle in no longer read to operate. There is furthermore the risk that it is damaged between the supporting body and the vehicle frame, which are now able to abut against each other due to the lack of spring action.

For this purpose, in the aforementioned specific embodiment of the "DCA Railmaster", a special solution is provided in that the supporting body merely rests on the air-bellows mount so that it can be lifted off. When loading a commercial vehicle equipped with this specific embodiment for piggyback transport, the supporting body is thus lifted off from the air-bellows mount and remains separated from the latter until the commercial vehicle is set down again. When setting down the commercial vehicle, the supporting body and the air-bellows mount are brought close to each other, and the supporting body is again supported on the air-bellows mount. Consequently, the axle body can no longer transmit a tensile force onto the air bellows and the air bellow thus can no longer be stretched by the force of the weight of the axle body.

In order to secure the supporting body in position on the air-bellows mount, the coupling projection engages in the coupling receptacle and physically prevents a translatory relative movement between the supporting body and the air-bellows mount orthogonally to the preload direction. So that the air-bellows mount and the supporting body are able to meet again and that the supporting body is able to be supported on the air-bellows mount in a precisely positioned manner when the commercial vehicle is set down again, the coupling projection on the specific embodiment "DCA Railmaster" is tapered along the projection path toward the supporting body and the coupling recess is formed to be complementary to the coupling projection. A centering effect is thereby achieved when bringing the coupling projection and the coupling recess close to each other.

As was already mentioned above, apart from the particular solution conceived only for the piggyback transport, the supporting body is screwed to the air-bellows mount, which makes the mounting process of the air-suspension module on the vehicle cumbersome. The axle body supporting the air-bellows mount, like the air bellows, is directly connected to the vehicle frame in a manner that forces a constructionally predetermined relative kinematics onto each of the mentioned components. Within the scope of the respective relative kinematics, the air-bellows mount and the supporting body must be paired and secured in position by screwing, so that the air-bellows module in conventional air-suspension modules, with the exception of the DCA Railmaster, is not only supported on the air-bellows mount, but that it is also secured on the latter against liftoff.

SUMMARY OF THE INVENTION

The present invention is based on the objective of indicating an air-suspension module, which is able to be coupled to the air-bellows mount and secured on the air-bellows mount against liftoff in a more simple manner than hitherto.

The present invention achieves this objective by means of an air-suspension module mentioned at the outset, in which additionally one of the components of the air-bellows mount and the supporting body has a latching body and the respectively other component of the air-bellows mount and the supporting body has a latching recess such that in the operational state of the air-suspension module the latching body is in form-locking latching engagement with the latching recess so that a translatory relative movement of the supporting body relative to the air-bellows mount is physically limited in the two opposite directions along the projection path.

In contrast with the solution hitherto used in the relevant field of a screw connection between the supporting body and the air-bellows mount, the present invention proposes latching the supporting body on the air-bellows mount.

By engaging the coupling projection into the coupling recess, it is possible to ensure a sufficient positioning and alignment of the supporting body and the air-bellows mount relative to each other, which allows for a latching engagement of the latching body and the latching recess for securing the supporting body and the air-bellows mount to each other readily, in particular without engaging a tool. It is thus possible to eliminate the hitherto cumbersome screw connection.

For establishing the latching engagement, the latching body may be movably situated on its supporting component at least sectionally in a direction crosswise with respect to the projection path.

In principle, it may suffice that the latching engagement limits the relative mobility of the supporting body and the air-bellows mount in the two opposite directions along the projection path, but that within the limits a relative movement is possible, for example with a movement play of a few millimeters. Preferably, however, the supporting body is connected by the latching engagement to the air-suspension module along the projection path without play.

In order to prevent an unintentional release of the latching engagement and thus an unintentional liftoff of the supporting body from the air bellows mount, the latching engagement is preferably an insuperable latching engagement. In this context, "insuperable" means that the latching engagement is designed and dimensioned in such a way that in the event that a vehicle having a rigid axle with the air-suspension module lifts off from the ground, the latching engagement is not released by the force of the weight of the operational rigid axis acting upon it.

Unless specifically stated otherwise in the present application, the present application describes the invention in the operational state of the air-suspension module, i.e. installed between the vehicle frame of a vehicle and an axle body of a rigid axle supporting the vehicle frame and standing on firm ground.

For the advantageous automatic establishment of the aforementioned latching engagement when the supporting body and the air-bellows mount are brought close to each other, an advantageous refinement of the present invention may provide for at least an engagement section of the latching body designed for the direct form-locking engagement with the latching recess to be preloaded into its engagement position and to be displaceable against this preload from the engagement position. Thus, for mounting on the rigid axle having the air-bellows module, it may suffice to bring the vehicle frame close to the rigid axle standing via wheels on firm ground. With increasing proximity, the weight of the vehicle frame may provide the force necessary for displacing the engagement section from the engagement position. The displacement of the engagement section from the engagement position preferably continues until the latching recess by approach has reached a position, in which the engagement section on account of its preload is displaced back into its engagement position, which is then in the latching recess. The engagement section is then preferably surrounded on three sides by material of the component having the latching recess.

At least the engagement section of the latching body is preferably accommodated on the component having the latching body so as to be movable or displaceable crosswise with respect to the projection path.

The engagement section is preferably preloaded into its engagement position even after the latching engagement has been established. By loading the engagement section in the operational state of the air-bellows module with the force of the weight of the vehicle frame, the engagement section may be held in the engagement position, in addition to its preload, by a frictional force then acting between a wall of the latching recess and the engagement section abutting against it.

Even if it is in principle conceivable within the scope of the present invention that the engagement section is preloaded into the engagement position by its own weight, it is preferred, for the purpose of providing a defined preload of the engagement section independently of its orientation relative to the force of gravity that the engagement section is preloaded by a spring into the engagement position.

Quite generally, the latching body may be preloaded into the engagement position by a spring formed or developed separately of the latching body. An advantageously low number of components required for forming the air-suspension module may be obtained, however, in that the latching body is a spring and that the engagement section is a section of the spring. Thus, a section of the spring forming the latching body may be the engagement section, which is preloaded into the engagement position by itself and/or by a further spring section connected to it, preferably in one piece. The engagement position is in this context always the position, in which the engagement section in cooperation with the latching recess is in latching engagement.

In order to achieve a bearing force of the latching engagement that is as great as possible, a plurality of engagement sections may be provided. What was said above regarding the at least one engagement section then preferably applies for several of the engagement sections, particularly preferably for all engagement sections.

According to a constructionally particularly simple and therefore preferred refinement, the spring may be a bow spring having two spring legs situated opposite each other across a spring gap and connected to each other by a spring bow bridging the spring gap. Preferably, at least one engagement section is formed or developed on at least one spring leg, particularly preferably respectively at least one engagement section being formed or developed on each of the spring legs. A bow spring of this kind preferably has a rough-schematically U-shaped design, it being possible for the two essentially parallel spring legs to be loaded by the connecting spring bow as base section away from each other or toward each other. In an advantageous manner, such a bow spring having mutually two opposite spring legs, one on each of two different, preferably opposite, sides of the coupling projection or the coupling recess is able to effect a preload of engagement sections into the engagement position.

Preferably, the mutually opposite spring legs, in particular the engagement sections of the latching body formed or developed on them, run on respectively another side of the imaginary virtual projection path centrally passing through the coupling projection, preferably in a direction crosswise with respect to the projection path. Preferably, the two spring legs, in particular with the engagement sections formed or developed on them, run not only on respectively another side of the projection path, but also on a respectively other side of the coupling projection. Thus, a section of the coupling projection is preferably situated between the spring legs. The path of the spring legs crosswise with respect to the projection path impedes or prevents an action of force along the spring legs by a source of force acting along the projection path. This increases the engagement secureness of the latching engagement.

Likewise, the mutually opposite spring legs, in particular the engagement sections of the latching body formed or developed on them, run on respectively another side of a section of the coupling recess, so that a section of the coupling recess is situated between the spring legs, the section of the coupling recess situated between the spring legs in this preferred refinement being at least partially, preferably for the most part, covered by material of the coupling projection due to the engagement of the coupling projection into the coupling recess.

For the advantageously automatic insertion of the coupling projection into the coupling recess along the projection path when bringing the supporting body and air-bellows mount close to each other, there may be a provision for the coupling projection to be formed or developed so as to taper along the projection path in the direction away from its supporting structure and/or for the coupling recess to be formed or developed so as to widen in the direction toward an insertion opening, through which the coupling projection engages into the coupling recess in the operational state of the air-suspension module.

Although for the purpose of a maximally effective centering action, the coupling recess may be formed or developed to be at least sectionally complementary to the coupling projection, this is not necessary. In an embodiment of the coupling recess that is complementary to the tapered coupling projection in the manner mentioned above, a contact engagement occurs between an outer wall of the coupling projection and an inner wall of the coupling recess. It is conceivable, however, to use the tapered design or development of the coupling projection only as an aid for inserting the coupling projection into the coupling recess and to produce a contact engagement, which physically prevents a movement of the supporting body along the projection path in the direction toward the air-bellows mount, outside of the tapered outer surface of the coupling projection, in order to remove load from this outer surface in operation. For this reason, at least in its section having the coupling projection, the coupling recess may have for example an essentially hollow cylindrical design or a hollow conical design having a greater conical angle than the coupling projection, or a combination of the one and the other in sections.

In principle, the coupling projection may be provided on the supporting body and the coupling recess may be provided on the air-bellows mount. The air-bellows mount is normally an oblong component. The formation or development of a coupling recess on the air-bellows mount, which is possible in principle, could result in the air-bellows mount experiencing locally undesired weakenings, however, the attenuation or removal of which would require the provision of additional material on the air-bellows mount. A lower total weight of the air-suspension module while providing the same functionality may therefore be achieved by providing the coupling projection on the air-bellows mount and the coupling recess on the supporting body. The supporting body may be formed or developed to be hollow in sections for example.

The coupling projection may then be mounted on its supporting component, in particular on the air-bellows mount, as a separate component. To avoid installation processes while at the same time achieving an air-bellows mount that is as stiff and solid as possible, the coupling projection is preferably formed or developed in one piece with the rest of the air-bellows mount, for example as a cast component. The air-bellows mount may be formed from cast steel or from an aluminum alloy. The supporting body may likewise be formed from metal or from a fiber-reinforced plastic.

In principle, the latching body may also be provided on the coupling projection and the latching recess may be provided on the supporting body. However, if the coupling projection, when it is inserted into the coupling recess, is to be able to displace, on account of its tapered design along the projection path, the at least one engagement section against its preload from the engagement position, in order to achieve an automatic latching, it is advantageous if the latching body is provided on the supporting body and the latching recess is provided on the coupling projection. For in that case it is a particularly simple matter to bring about a relative movement of the coupling projection and the latching body effecting the displacement of the at least one engagement section from the engagement position.

In order to achieve a supporting body that is as dimensionally stable as possible at a minimal weight, the supporting body may have an inner body section having the coupling recess and an outer body section surrounding the inner body section. To aim for the lowest possible weight of the supporting body, the inner and/or the outer body section may be a sleeve section. Preferably, both body sections are sleeve sections, particularly preferably coaxial sleeve sections.

The inner and/or the outer sleeve section may have a cylindrical or conical design. The cavity surrounded by the inner sleeve section may form the coupling recess. In the operational state of the air-suspension module, an axial region of the inner sleeve section preferably surrounds a section of the coupling projection engaging in the sleeve section without play in the orthogonal direction with respect to the projection path, so that a relative movement of the supporting component and the air-bellows mount orthogonally with respect to the projection path is not only limited, but is preferably prevented by the physical abutment of the inner sleeve section on the coupling projection.

To protect the latching engagement once it is established, the latching body and the latching recess may be surrounded by a section of the supporting body in the operational state of the air-suspension module. The latching engagement may thus be shielded to a certain extent against external influences. According to the advantageous embodiment described above, the outer body section, in particular as a sleeve section, may surround the latching body and the latching recess.

Although the latching engagement in the above sense is preferably an insuperable latching engagement, for purposes of maintenance and repair, it is advantageous if the latching body is removable from the rest of the air-suspension module. The latching body is preferably removable from the rest of the air-suspension module in a direction crosswise with respect to the projection path, since a load frequently occurring in operation along the projection path does not result, or results only to a small degree, in a load crosswise with respect to the projection path, which load could result in an unintended removal of the latching body from the rest of the air-suspension module.

In the preferred case described above of using a bow spring as the latching body, it is preferably possible to withdraw the latching body in a direction crosswise with respect to the projection path both from the coupling recess as well as from the coupling projection engaging in the coupling recess. The withdrawal direction, along which the latching body is able to be withdrawn from the rest of the air-suspension module, in particular from the coupling recess and from the coupling projection, is preferably crosswise, in particular orthogonal, to the direction in which the at least one spring leg, preferably both spring legs, with the engagement sections formed or developed thereon, is/are preloaded into the engagement position. This ensures that the latching engagement is maintained as long as possible when withdrawing the latching body in the form of the bow spring from the rest of the air-suspension module. The withdrawal direction of the bow spring preferably runs parallel to the two spring legs or, if the two spring legs are not oriented in parallel to each other, along a bisector of the angle enclosed by the two spring legs.

The direction of the preload of an engagement section formed or developed on a spring leg preferably runs in the direction toward the opposite spring leg or away from it, depending on on which component the bow spring is supported as the latching body and which other component is to be in a latching engagement with the at least one engagement section.

In order to avoid that a manipulation of the bow spring in one of the possible movement directions of the withdrawal direction of the bow spring and the displacement direction of the at least one engagement section into its engagement position or out of its engagement position causes a manipulation of the bow spring into the respective other direction, the withdrawal direction and the displacement direction or the corresponding preload direction of at least one engagement section preferably enclose an angle in a range of 70° to 110°, particularly preferably of 80° to 100°.

When the coupling recess together with the coupling projection engaging into it is surrounded by an aforementioned outer sleeve section of the supporting body, the radial distance of the outer sleeve section from the coupling recess, in particular from the inner sleeve section preferably forming the coupling recess, and the length of the bow spring are preferably dimensioned in such a way that the bow spring may be withdrawn from the rest of the air-suspension module within the space surrounded by the outer sleeve section. This allows for a withdrawal of the bow spring without excessive deformation of the bow spring.

The present invention also relates to a rigid axle for a commercial vehicle, in particular for a cargo truck, comprising an axle body extending along an axle direction and including at least one air-suspension module, as it is described and refined above, at least one air-bellows mount of the air-suspension module protruding from the axle body crosswise with respect to the axle direction.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Figure 1:
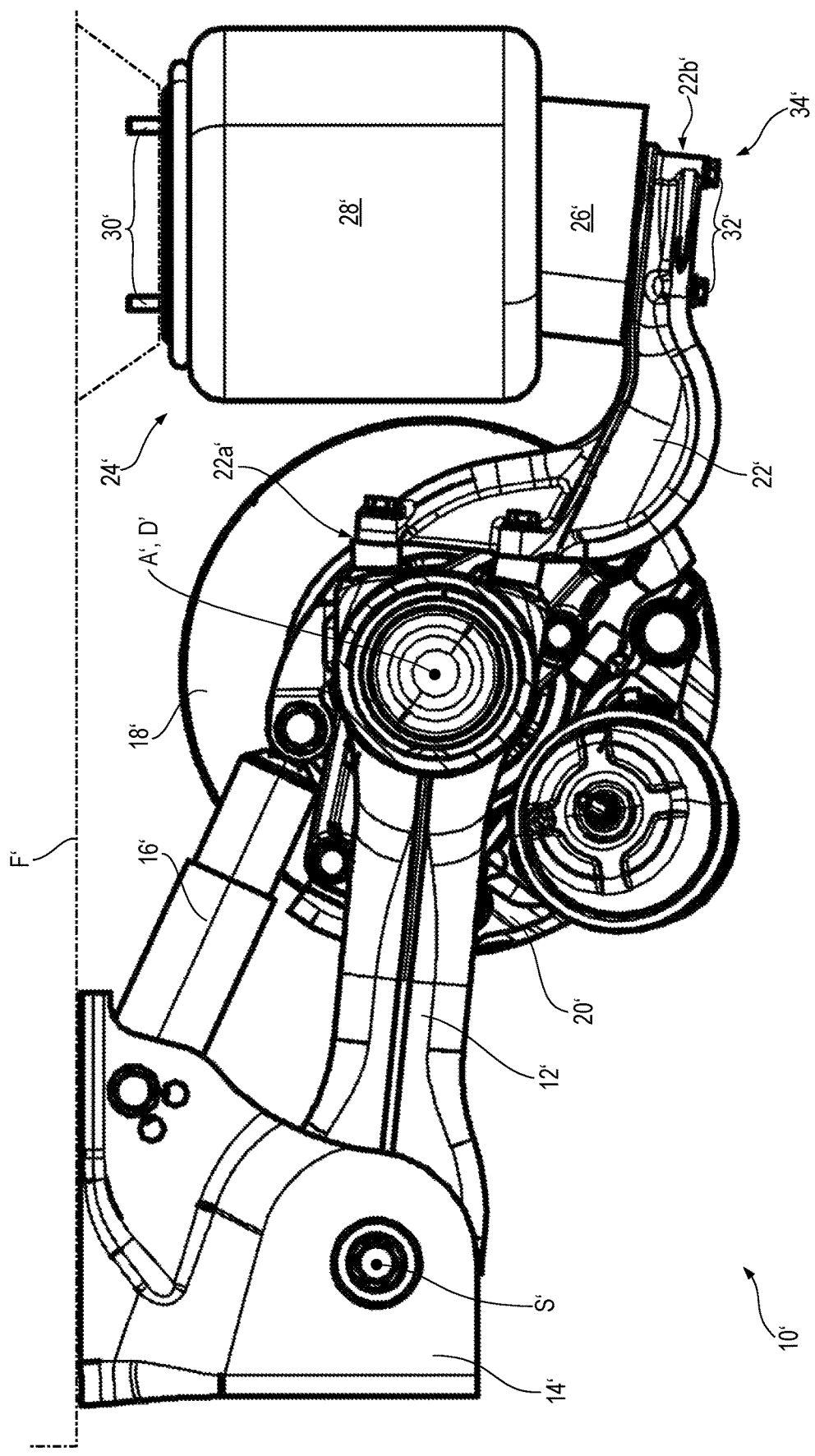
FIG. 1 a rough schematic view along the axle direction of a rigid axle sectioned in its transverse center of the related art having a sectional plane that is orthogonal with respect to the axle direction of the rigid axle, FIG. 2 a rough schematic lateral view along the axle direction of a rigid axle according to the invention, FIG. 3 a rough schematic sectional view of an air-suspension module according to the invention, mounted on an axle body of the rigid axle from FIG. 2, which is indicated only in rough schematic fashion, in a sectional plane orthogonal with respect to the axle direction of the rigid axle, FIG. 4 a rough schematic sectional view of the magnifying glass enlargement IV-IV from FIG. 3.

Referring now to the drawings wherein the showings are for the purpose of illustrating preferred and alternative embodiments of the invention only and not for the purpose of limiting the same, in FIG. 1, a rigid axle of the related art is generally denoted by reference symbol 10'. The rigid axle 10' is, as is customary in rigid axles, formed or developed in mirror symmetry with respect to a vertical longitudinal central plane. A vertical longitudinal central plane in an operational state installed on a vehicle runs in parallel to the roll axis and in parallel to the yaw axis and orthogonally to the pitch axis of the vehicle. In FIG. 1, the viewer looks onto the part of the rigid axle 10' situated behind a sectional plane parallel to the vertical longitudinal central plane.

The axle body 12' extending along the axle direction A' that is orthogonal to the drawing plane of FIG. 1 and parallel to the pitch axis of a vehicle comprising the rigid axle 10' is pivoted on a bearing block 14' about a swivel axis S' that is parallel to the axle direction A'. A damper 16' is hinged with its one end on bearing block 14' and with its other end on axle body 12'. The damper 16' dampens a swivel movement of the axle body 12' about the swivel axis S'.

In the background, FIG. 1 shows a brake disk 18' concentrically situated about the wheel axis D' defined by the rigid axle 10' and a brake caliper 20' grasping the brake disk 18' in interaction with the brake disk 18'.

On the side of the axle body 12' facing away from the bearing block 14', a conventional air-bellows mount 22' is fastened by bolts on its mounting end 22a'. On the bearing end 22b' of the air-bellows mount 22' opposite the mounting end 22a', an air-bellows module 24' is anchored. The air-bellows module 24' comprises a supporting body 26' and an air-bellows 28'.

On its end remote from the bearing end 22b' or from the supporting body 26', the air-bellows 28' is connectible or connected to a vehicle frame F', indicated merely by dot-dash lines, for example by two threaded pins 30'.

On its end situated remotely from the air bellows 28', the supporting body 26' is firmly connected to the bearing end 22b', by two screws 32' for example.

The air-bellows mount 22' and the air-bellows module 24' jointly form an air-suspension module 34'.

Producing this firm connection of the supporting body 26' to the bearing end 22b' by the screws 32' is cumbersome and may be substantially simplified by the present invention.

Figure 2:
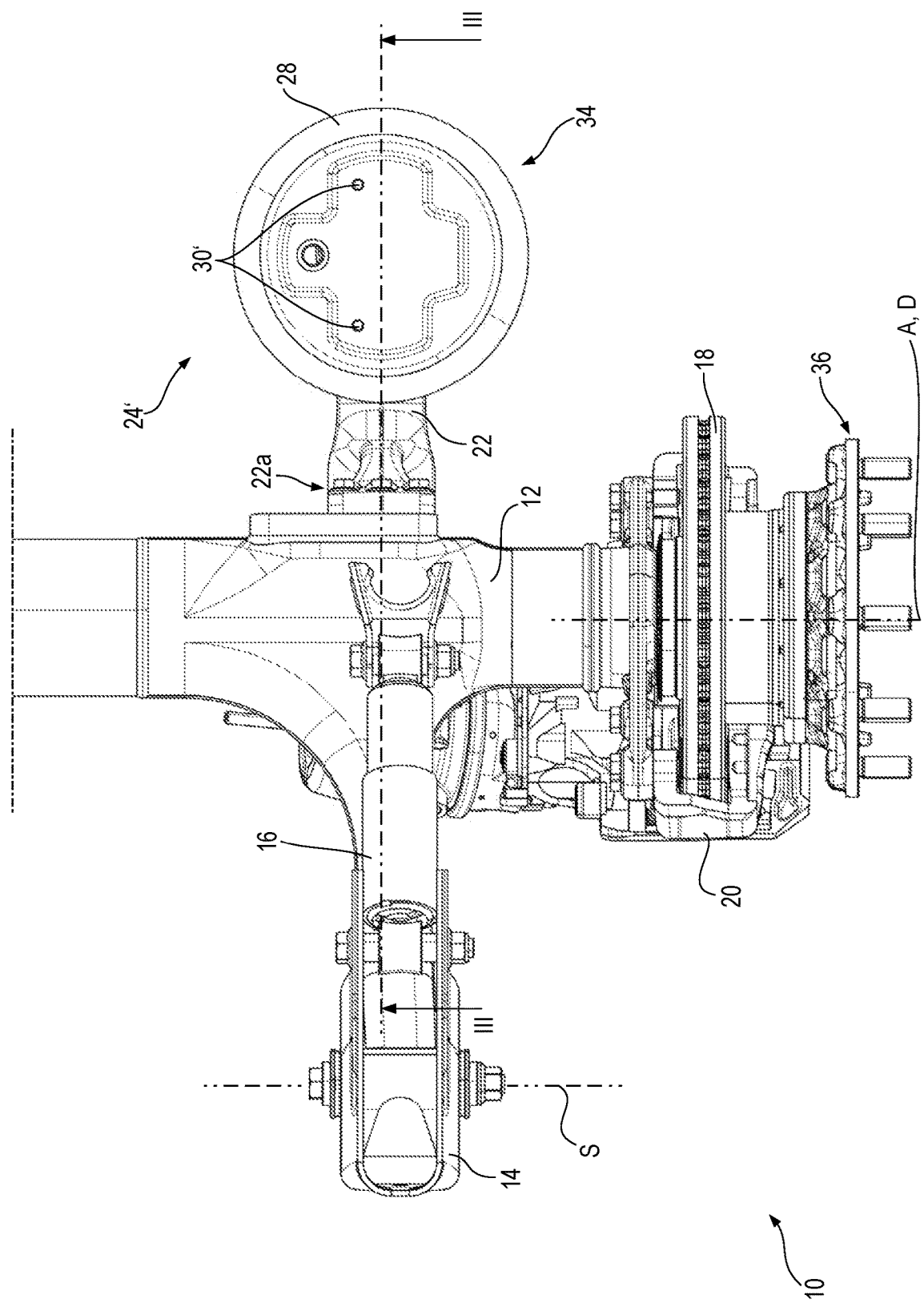

In a rough schematic top view, FIG. 2 shows a rigid axle 10 according to the invention, more precisely its one half, which extends up to the mirror symmetry plane SE that is parallel to the yaw axis and to the roll axis of the vehicle comprising the rigid axle 10 and is orthogonal to the axle direction A. The rigid axle 10 is in mirror symmetry with respect to this mirror symmetry plane SE.

Identical and functionally equivalent components and component sections as in FIG. 1 are indicated in the FIGS. 2 through 5 relating to a specific embodiment of the invention by the same reference symbols, but without apostrophe.

In addition to the components already known from FIG. 1, FIG. 2 also shows, on the side of the brake disk 18 facing away from axle body 12, a wheel flange 36, on which a wheel, more precisely a wheel rim, may be fastened by lug nuts in a manner known per se.

Figure 3:
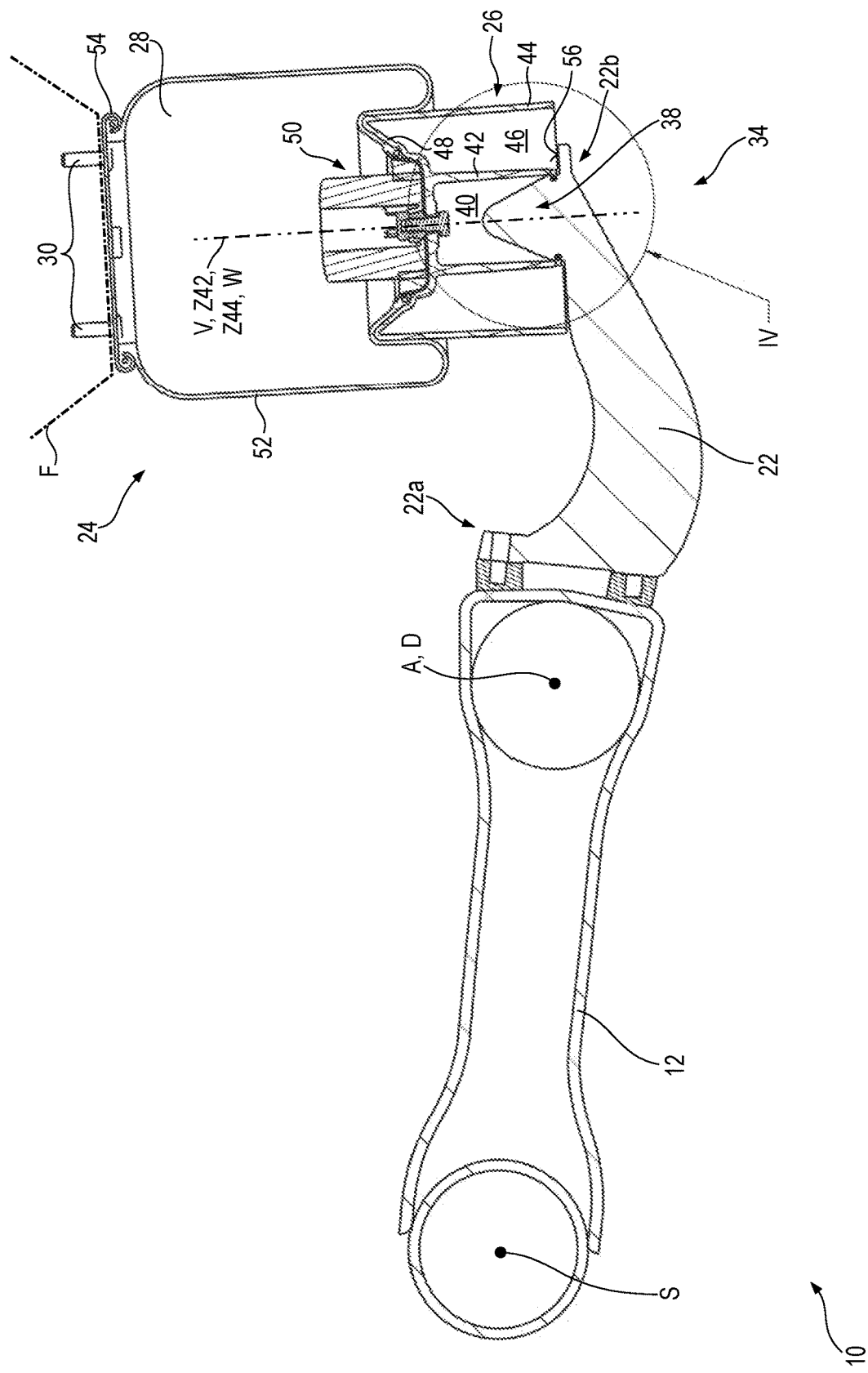

FIG. 3 shows a rough schematic sectional view in the sectional plane III-III of FIG. 2 through the axle body 12 and the air-bellows mount 22 retained thereon in the installed position together with the air-bellows module 24 secured thereon by latching engagement. The axle body 12 is illustrated only in a simplified manner, for example without the fastening formation for the longitudinal end of the damper 16 that is to be fastened on the axle body 12. The axle body 12 is presently not relevant. FIG. 3 is primarily to illustrate the construction of the air-suspension module 34.

At the bearing end 22b, a coupling projection 38 is formed or developed in one piece with the rest of the air-bellows mount 22, which protrudes from the latter along a projection path V. The coupling projection 38 is explained in greater detail further below in connection with the magnifying glass enlargement of FIG. 4.

The coupling projection 38 protrudes into a coupling recess 40, which is defined by an inner sleeve section 42 of the supporting body 26. The inner sleeve section 42 is an essentially cylindrical sleeve section, whose cylinder axis Z42 is collinear with the projection path V.

In the present case, the projection path V is a rectilinear projection axis V.

The inner sleeve section 42 is surrounded by an outer sleeve section 44, which is likewise an essentially cylindrical sleeve section. In the illustrated example, the cylinder axis Z44 of the outer sleeve section 44 is collinear with the cylinder axis Z42 and with the projection path V. Between the inner sleeve section 42 and the outer sleeve section 44, there is an air-filled cavity 46, which is open on the side facing away from the air bellows 28.

At their axial longitudinal ends situated closer to the air bellows 28, the sleeve sections 42 and 44 end in a joint bottom 48, which is essentially frustoconically shaped in the illustrated example. The bottom 48, widening in the direction toward the air bellows 28, together with a clamping block 50, serve, in a manner known per se, to secure an elastic skin 52 of the air bellows 28 in position. At the longitudinal end of the air bellows 28 situated remotely from the supporting body 26, an end plate 54 is situated, which is anchored in form-locking fashion in the elastomer material of the elastic skin 52 of the air bellows 28. The end plate 54 supports the aforementioned threaded pins 30, by which the air bellows 28 and the air-bellows module 24 as a whole may be fastened on the vehicle frame F.

In the operation of the air-suspension module 34, the air bellows 28 acts as an air spring, so that the end plate 54 and supporting body 26 are able to approach each other and move away from each other along a spring path W essentially coinciding with the projection path V. The end plate 54 and the supporting body 26 are also able to rotate relative to each other about an axis of rotation that is orthogonal to the spring path W, in particular parallel to the axle direction A. For a compression and expansion of the air bellows 28, the elastic skin 52 is flexed in a manner known per se, in particular flexed as uniformly as possible in the circumferential direction about spring path W.

In contrast to the fastening solution of the related art in FIG. 1, the supporting body 26 of the air-compression module 34 of FIGS. 2 and 3 is not screwed to the air-bellows mount 22, but is rather latched to it. In spite of the latching, the supporting body 26 is secured in position without play on the air-bellows mount 22, i.e. it cannot be brought closer to the air-bellows mount 22 and cannot be removed from it. Since the inner sleeve arrangement 42 abuts against the coupling projection 38 circumferentially around the projection path V, the supporting body 26 is also translatorily immovable orthogonally to the projection path V relative to the air-bellows mount 22.

Figure 4:
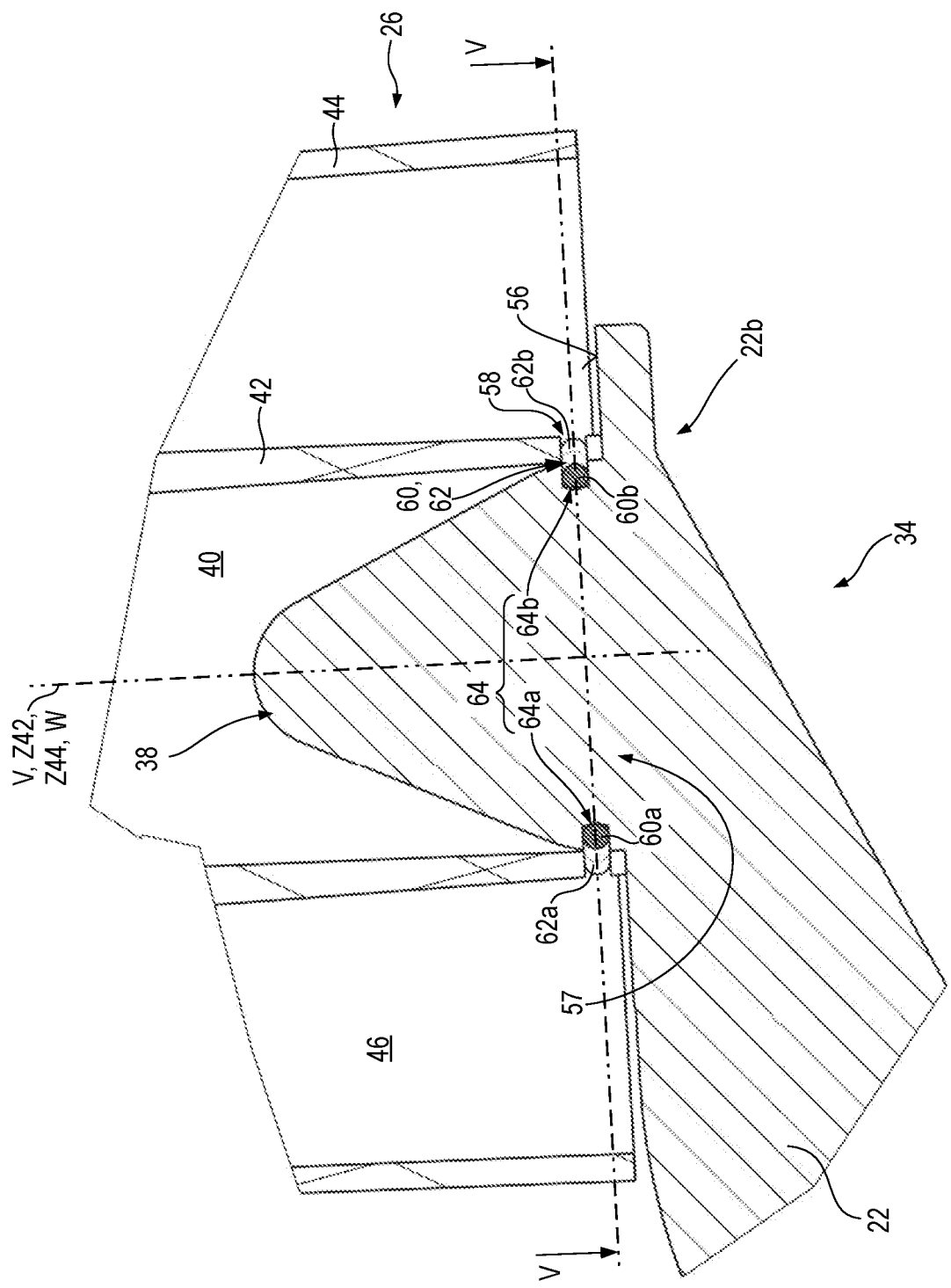
Figure 5:
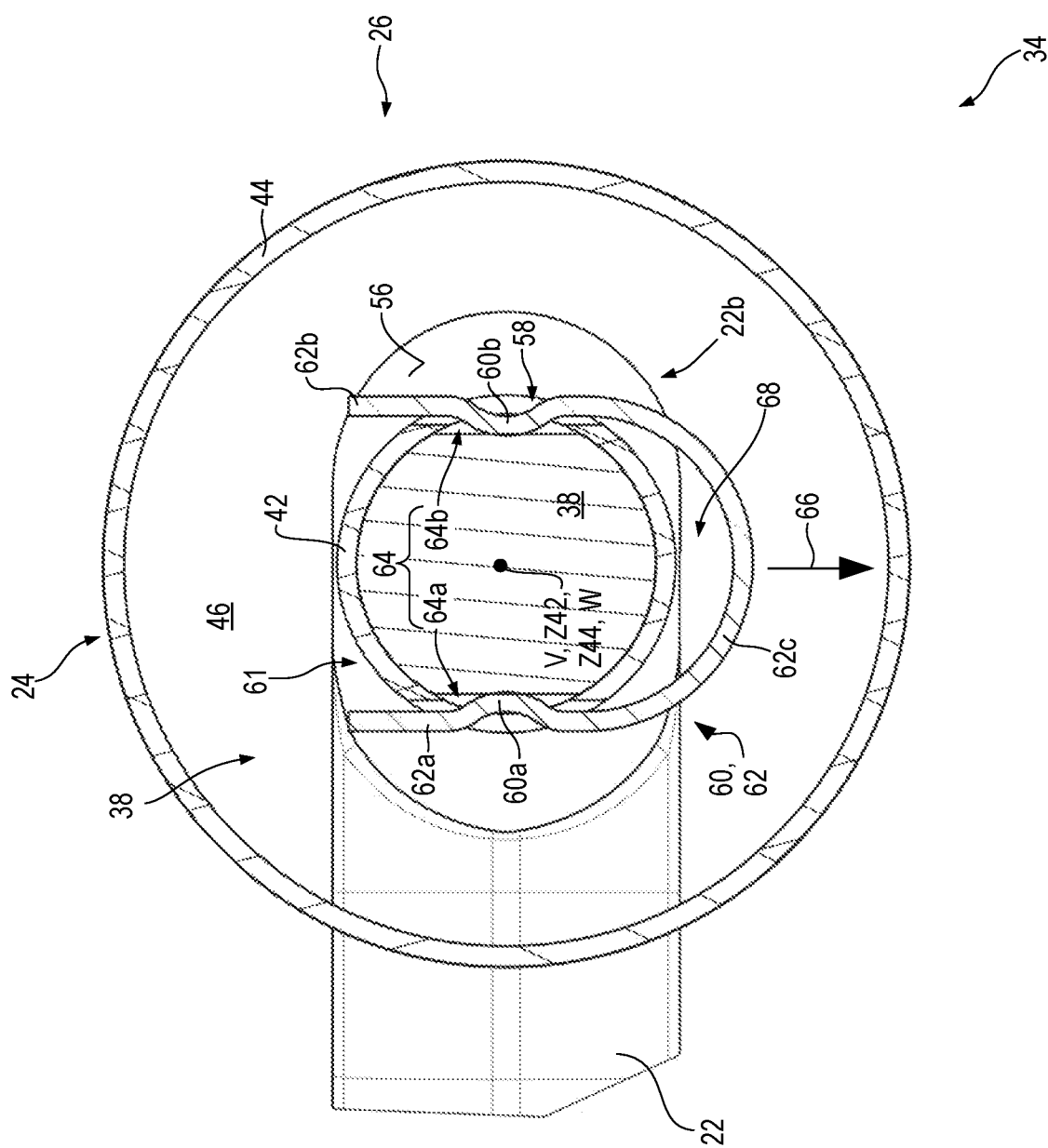
FIG. 5 a rough schematic sectional view along the sectional plane V-V in FIG. 4.

An advantageous constructional example for the embodiment or development of the attachment of the supporting body 26 on the air-bellows mount 22 is explained below with reference to FIGS. 4 and 5. FIG. 4 shows the detail of the air-suspension module 34 contained in the magnifying glass IV of FIG. 3 in an enlarged manner. FIG. 5 shows a sectional view of the air-suspension module 34 along the sectional plane V-V in FIG. 4.

The coupling projection 38 in the illustrated exemplary embodiment is surrounded by a preferably flat contact surface 56, which is formed in one piece on the air-bellows mount 22. The inner sleeve section 42 physically abuts against this contact surface 56 with its end face, situated remotely from bottom 48, surrounding an insertion opening 57 of the inner sleeve section 42. In the illustrated exemplary embodiment, the inner sleeve section 42 slightly protrudes axially beyond the outer sleeve section 44. However, this need not be so.

The inner sleeve section 42 has two retaining openings 58 situated diametrically opposite each other relative to the cylinder axis Z42 of the inner sleeve section 42, in which a latching body 60 in the form of a bow spring 62 is accommodated (see also FIG. 5). The retaining openings 58, only one of which is provided with a reference symbol in the figures for better clarity, may take the form of simple slots. These slots preferably run crosswise to the projection path V or crosswise to cylinder axis Z42.

The U-shaped bow spring 62 as the latching body 60 has two essentially parallel spring legs 62a and 62b, which are connected to each other by a spring bow 62c bridging the spring gap 61 between the spring legs 62a and 62b. A section of the spring legs 62a and 62b, which is curved and bulged toward the respectively opposite spring leg, is an engagement section 60a and 60b, respectively, on the latching body 60, which engages into a latching recess 64 in the air-bellows mount 22 and there preferably in the coupling projection 38. The spring legs 62a and 62b and consequently the engagement sections 60a and 60b, respectively, are in the present case preloaded toward each other by the spring bow 62c, crosswise with respect to the projection path V or to the cylinder axis Z42.

The latching recess 64 comprises two essentially parallel grooves 64a and 64b in the coupling projection 38, which run crosswise and in particular orthogonally with respect to the projection path V, and into which the engagement sections 60a and 60b, respectively, protrude in their engagement position shown in FIGS. 4 and 5.

During the assembly of the air-suspension module 34, with the insertion movement of the coupling projection 38 along the virtual projection path V into the coupling recess 40, the engagement sections 60a and 60b may be displaced from the engagement position against the preload of the spring bow 62*c* by the coupling projection 38, due to its shape tapering along the projection path V, until the latching recess 64 in the form of the two grooves 64*a* and 64*b* aligns with the engagement sections 60*a* and 60*b*, respectively, and thus the engagement sections 60*a* and 60*b*, on account of being preloaded by the spring bow 62*c*, are able to move automatically into the respectively associated groove 64*a* and 64*b*, back into their engagement position.

Of the initially separate components of the air-bellows mount 22 and the air-bellows module 24, it then suffices for the purpose of assembling the air-suspension module 34 to screw the air-bellows mount 22 to to the axle body 12 and to screw the air-bellows module 24 to the vehicle frame F using the threaded pins 30. If the axle body 12, which is likewise connected to the vehicle frame F via the bearing block 14 explained in connection with FIG. 1, with the vehicle wheels fastened on the axle body 12 is then set on a firm ground, the coupling projection 38 moves about the swivel axis S (see FIG. 3) relative to the vehicle frame F toward the latter. In the process, the tapered surface of the coupling projection 38 acts as an insertion aid in order to insert the coupling projection 38 into the coupling recess 40. During this insertion movement, driven by the force due to the weight of the vehicle frame F, the engagement sections 60*a* and 60*b* are displaced from their engagement position, as described above, until, due to the corresponding spatial arrangement of the latching recess 64, they are able to shift back into their engagement position, whereby the latching engagement of the latching body 60 with the latching recess 64 is established without application of a tool on the air-suspension module 34.

The latching body 60 may be withdrawn from the supporting body 26 and the coupling projection 38 in the direction of arrow 66 shown in FIG. 5 crosswise with respect to the projection path V and crosswise with respect to the mutually converging preload directions of the engagement sections 60*a* and 60*b*. For this purpose, a tool, such as for example a screwdriver or any other metal rod, may be inserted as a lever into the loop formed by the spring bow 62*c*, and the bow spring 62 may be driven out along arrow 66 by applying the lever to a section of the solid cast component of the air-bellows mount 22. In this manner, it is possible to separate the air-bellows module 24 from the air-bellows mount 22 for repair and maintenance purposes.

For coupling the air-bellows mount 22 again to the air-bellows module 24, it suffices to situate a bow spring 62 in the retaining openings 58 in order to repeat the above-described automatic, tool-free coupling of the air-bellows mount 22 and the air-bellows module 24.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. An air-suspension module for a rigid axle of a commercial motor vehicle, comprising an air-bellows mount and an air-bellows module supported on the air-bellows mount in the operational state of the air-suspension module, the air-bellows module having an air-suspension bellows designed to change its shape and a supporting body connected to the air-suspension bellows, one of the components of the air-bellows mount and the supporting body having a coupling projection protruding along a virtual projection path, which in the operational state of the air-suspension module engages with a coupling recess formed on the respectively other component of the air-bellows mount and the supporting body along the projection path, a translatory relative movement of the supporting body, in the operational state of the air-suspension module, being physically limited relative to the air-bellows mount, orthogonally with respect to the projection path and in a direction along the projection path, wherein one of the components of the air-bellows mount and the supporting body has a latching body and the respectively other component of the air-bellows mount and the supporting body has a latching recess such that in the operational state of the air-suspension module the latching body is in a form-locking latching engagement with the latching recess, so that a translatory relative movement of the supporting body relative to the air-bellows mount is physically limited in the two opposite directions along the projection path wherein at least prior to an insertion of the coupling projection into the coupling recess and thus prior to establishing the latching engagement, at least an engagement section of the latching body, designed for the direct form-locking engagement with the latching recess, is preloaded towards its engagement position and is displaceable from the engagement position against this preload, wherein the engagement section is preloaded by a spring towards the engagement position, wherein the latching body is the spring and the engagement section is a section of the spring, and wherein the spring is a bow spring having two spring legs situated opposite each other across a spring gap and connected to each other by a spring bow, at least one engagement section being formed on each of the spring legs.

2. The air-suspension module as recited in claim 1, wherein the latching engagement is an insuperable latching engagement.

3. The air-suspension module as recited in claim 2, wherein at least prior to an insertion of the coupling projection into the coupling recess and thus prior to establishing the latching engagement, at least an engagement section of the latching body, designed for the direct form-locking engagement with the latching recess, is preloaded towards its engagement position and is displaceable from the engagement position against this preload.

4. The air-suspension module as recited in claim 1, wherein the spring is a bow spring having two spring legs situated opposite each other across a spring gap and connected to each other by a spring bow, at least one engagement section being formed on each of the spring legs.

5. The air-suspension module as recited in claim 1, wherein the coupling projection is tapered along the projection path in the direction away from its supporting structure and/or the coupling recess widens in the direction toward an insertion opening, through which the coupling projection engages into the coupling recess in the operational state of the air-suspension module.

6. The air-suspension module as recited in claim 1, wherein the coupling projection is formed on the air-bellows mount and the coupling recess is formed on the supporting body.

7. The air-suspension module as recited in claim 1, wherein the latching body is formed on the supporting body and the latching recess is formed on the coupling projection.

8. The air-suspension module as recited in claim 1, wherein the supporting body has an inner body section including the coupling recess and an outer body section surrounding the inner body section.

9. The air-suspension module as recited in claim 8, wherein the inner body section and/or the outer body section are sleeve sections.

10. The air-suspension module as recited in claim 1, wherein the latching body and the latching recess are surrounded by a section of the supporting body in the operational state of the air-suspension module.

11. The air-suspension module as recited in claim 1, wherein the latching body is removable from the rest of the air-suspension module.

12. The air-suspension module as recited in claim 11, wherein the latching body is a bow spring having two spring legs situated opposite each other across a spring gap and connected to each other by a spring bow, at least one engagement section being formed on each of the spring legs, and wherein the bow spring as the latching body is withdrawable in a direction crosswise with respect to the projection path both from the coupling recess as well as from the coupling projection engaging in the coupling recess.

13. A rigid axle for a commercial vehicle, comprising an axle body extending along an axle direction and having at least one air-suspension module as recited in claim 1, at least one air-bellows mount protruding from the axle body crosswise with respect to the axle direction.

14. An air-suspension module for a rigid axle of a commercial motor vehicle, comprising an air-bellows mount and an air-bellows module supported on the air-bellows mount in the operational state of the air-suspension module, the air-bellows module having an air-suspension bellows designed to change its shape and a supporting body connected to the air-suspension bellows, one of the components of the air-bellows mount and the supporting body having a coupling projection protruding along a virtual projection path, which in the operational state of the air-suspension module engages with a coupling recess formed on the respectively other component of the air-bellows mount and the supporting body along the projection path, a translatory relative movement of the supporting body, in the operational state of the air-suspension module, being physically limited relative to the air-bellows mount, orthogonally with respect to the projection path and in a direction along the projection path, wherein one of the components of the air-bellows mount and the supporting body has a latching body and the respectively other component of the air-bellows mount and the supporting body has a latching recess such that in the operational state of the air-suspension module the latching body is in a form-locking latching engagement with the latching recess, so that a translatory relative movement of the supporting body relative to the air-bellows mount is physically limited in the two opposite directions along the projection path, wherein the coupling projection is tapered along the projection path in the direction away from its supporting structure and/or the coupling recess widens in the direction toward an insertion opening, through which the coupling projection engages into the coupling recess in the operational state of the air-suspension module.

15. The air-suspension module as recited in claim 14, wherein the coupling projection is formed on the air-bellows mount and the coupling recess is formed on the supporting body.

16. The air-suspension module as recited in claim 14, wherein the latching body is formed on the supporting body and the latching recess is formed on the coupling projection.

17. The air-suspension module as recited in claim 14, wherein the supporting body has an inner body section including the coupling recess and an outer body section surrounding the inner body section.

18. An air-suspension module for a rigid axle of a commercial motor vehicle, comprising an air-bellows mount and an air-bellows module supported on the air-bellows mount in the operational state of the air-suspension module, the air-bellows module having an air-suspension bellows designed to change its shape and a supporting body connected to the air-suspension bellows, one of the components of the air-bellows mount and the supporting body having a coupling projection protruding along a virtual projection path, which in the operational state of the air-suspension module engages with a coupling recess formed on the respectively other component of the air-bellows mount and the supporting body along the projection path, a translatory relative movement of the supporting body, in the operational state of the air-suspension module, being physically limited relative to the air-bellows mount, orthogonally with respect to the projection path and in a direction along the projection path, wherein one of the components of the air-bellows mount and the supporting body has a latching body and the respectively other component of the air-bellows mount and the supporting body has a latching recess such that in the operational state of the air-suspension module the latching body is in a form-locking latching engagement with the latching recess, so that a translatory relative movement of the supporting body relative to the air-bellows mount is physically limited in the two opposite directions along the projection path, wherein the latching body is removable from the rest of the air-suspension module, wherein the latching body is a bow spring having two spring legs situated opposite each other across a spring gap and connected to each other by a spring bow, at least one engagement section being formed on each of the spring legs, and wherein the bow spring as the latching body is withdrawable in a direction crosswise with respect to the projection path both from the coupling recess as well as from the coupling projection engaging in the coupling recess.

19. The air-suspension module as recited in claim 18, wherein the coupling projection is tapered along the projection path in the direction away from its supporting structure and/or the coupling recess widens in the direction toward an insertion opening, through which the coupling projection engages into the coupling recess in the operational state of the air-suspension module.

* * * * *